(12) United States Patent
Evans (10) Patent No.: US 8,694,793 B2
(45) Date of Patent: Apr. 8, 2014

(54) BIOMETRIC ACCESS CONTROL TRANSACTIONS

(75) Inventor: James Douglas Evans, Livermore, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 1124 days.

(21) Appl. No.: 12/001,502

(22) Filed: Dec. 11, 2007

(65) Prior Publication Data

US 2009/0150994 A1 Jun. 11, 2009

(51) Int. Cl.
*G06F 21/00* (2013.01)
*G06F 7/04* (2006.01)

(52) U.S. Cl.
USPC .......... 713/186; 713/182; 726/9; 726/20

(58) Field of Classification Search
USPC .......... 726/20, 9; 713/182, 186; 725/5; 382/115, 116, 121, 124
See application file for complete search history.

(56) References Cited

U.S. PATENT DOCUMENTS

| | | | |
|---|---|---|---|
| 4,253,086 A | 2/1981 | Szwarcbier | |
| 4,582,985 A | 4/1986 | Lofberg | |
| 5,072,103 A | 12/1991 | Nara | |
| 5,546,471 A | 8/1996 | Merjanian | |
| 5,613,012 A | 3/1997 | Hoffman et al. | |
| 5,615,277 A | 3/1997 | Hoffman | |
| 5,623,552 A * | 4/1997 | Lane ..................... | 382/124 |
| 5,737,439 A | 4/1998 | Lapsley et al. | |
| 5,764,789 A | 6/1998 | Pare, Jr. et al. | |
| 5,802,199 A | 9/1998 | Pare, Jr. et al. | |
| 5,805,719 A | 9/1998 | Pare, Jr. et al. | |
| 5,838,812 A | 11/1998 | Pare, Jr. et al. | |
| 5,870,723 A | 2/1999 | Pare, Jr. et al. | |
| 5,870,895 A | 2/1999 | Fally | |
| 5,982,914 A | 11/1999 | Lee et al. | |
| 6,012,039 A | 1/2000 | Hoffman et al. | |
| D425,873 S | 5/2000 | Anderson et al. | |
| 6,131,464 A | 10/2000 | Pare, Jr. et al. | |
| 6,154,879 A | 11/2000 | Pare, Jr. et al. | |
| 6,182,892 B1 * | 2/2001 | Angelo et al. .......... | 235/380 |

(Continued)

FOREIGN PATENT DOCUMENTS

AU 750154 B2 7/2002
KR 10-2001-0054151 A 7/2001

(Continued)

OTHER PUBLICATIONS

International Search Report for PCT/US2008/086414 (Filed Nov. 12, 2008); Visa U.S.A. Inc.

(Continued)

*Primary Examiner* — Mohammad W Reza
(74) *Attorney, Agent, or Firm* — Kilpatrick Townsend & Stockton LLP (57) ABSTRACT

Aspects and embodiments of the present disclosure provide devices and methods for biometric authentication of a user during access control transactions. In one aspect, an access control processor device, comprising a biometric input sensor configured to receive user biometric information; a biometric verification processor configured to authenticate the input user biometric information; and a communication element configured to activate when the biometric information entered into the biometric verification system is authenticated and maintain an inactive status for the communication element on the payment processor device when the biometric information entered into the biometric verification system is not authenticated.

23 Claims, 4 Drawing Sheets

(56) References Cited

U.S. PATENT DOCUMENTS

| | | |
|---|---|---|
| 6,185,318 B1 | 2/2001 | Jain et al. |
| 6,192,142 B1 | 2/2001 | Pare, Jr. et al. |
| 6,209,104 B1 | 3/2001 | Jalili |
| 6,230,148 B1 | 5/2001 | Pare, Jr. et al. |
| 6,269,348 B1 | 7/2001 | Pare, Jr. et al. |
| 6,366,682 B1 | 4/2002 | Hoffman et al. |
| 6,391,198 B1 | 5/2002 | Porter et al. |
| 6,397,198 B1 | 5/2002 | Hoffman et al. |
| 6,411,728 B1 | 6/2002 | Lee et al. |
| 6,581,042 B2 | 6/2003 | Pare, Jr. et al. |
| 6,591,002 B2 | 7/2003 | Lee et al. |
| 6,594,376 B2 | 7/2003 | Hoffman et al. |
| 6,662,166 B2 | 12/2003 | Pare, Jr. et al. |
| 6,728,397 B2 | 4/2004 | McNeal |
| 6,879,966 B1 | 4/2005 | Lapsley et al. |
| 6,920,435 B2 | 7/2005 | Hoffman et al. |
| 6,950,810 B2 | 9/2005 | Lapsley et al. |
| 6,957,770 B1 | 10/2005 | Robinson |
| 6,980,670 B1 | 12/2005 | Hoffman et al. |
| 6,985,608 B2 | 1/2006 | Hoffman et al. |
| 7,004,389 B1 | 2/2006 | Robinson et al. |
| 7,082,415 B1 | 7/2006 | Robinson et al. |
| 7,152,045 B2 | 12/2006 | Hoffman |
| 7,185,807 B1 | 3/2007 | Robinson et al. |
| 7,248,719 B2 | 7/2007 | Hoffman et al. |
| 7,269,737 B2 | 9/2007 | Robinson |
| 7,272,247 B2 * | 9/2007 | Hamid ............................ 382/124 |
| 7,308,584 B2 * | 12/2007 | Himmel et al. ................. 713/193 |
| 7,319,987 B1 | 1/2008 | Hoffman et al. |
| 7,334,735 B1 | 2/2008 | Antebi |
| 7,367,049 B1 | 4/2008 | Robinson et al. |
| 7,387,240 B2 | 6/2008 | Ziegler |
| 7,389,269 B1 | 6/2008 | Robinson et al. |
| 7,437,330 B1 | 10/2008 | Robinson et al. |
| 7,464,059 B1 | 12/2008 | Robinson et al. |
| 7,483,862 B1 | 1/2009 | Robinson et al. |
| 7,497,372 B1 | 3/2009 | Robinson et al. |
| 7,502,761 B2 | 3/2009 | Siegal et al. |
| 7,512,567 B2 | 3/2009 | Bemmel et al. |
| 7,526,652 B2 | 4/2009 | Ziegler |
| 7,533,066 B1 | 5/2009 | Robinson et al. |
| 7,533,809 B1 | 5/2009 | Robinson et al. |
| 7,536,352 B2 | 5/2009 | Lapsley et al. |
| 7,542,590 B1 | 6/2009 | Robinson et al. |
| 7,543,156 B2 * | 6/2009 | Campisi ......................... 713/186 |
| 7,545,621 B2 | 6/2009 | Haddad |
| 7,558,406 B1 | 7/2009 | Robinson et al. |
| 7,558,407 B2 | 7/2009 | Hoffman et al. |
| 7,565,329 B2 | 7/2009 | Lapsley et al. |
| 7,606,401 B2 | 10/2009 | Hoffman et al. |
| 7,613,659 B1 | 11/2009 | Hoffman et al. |
| 7,620,605 B2 | 11/2009 | Hoffman et al. |
| 7,624,073 B1 | 11/2009 | Robinson et al. |
| 7,631,193 B1 | 12/2009 | Hoffman |
| 7,698,567 B2 | 4/2010 | Hoffman |
| 7,747,528 B1 | 6/2010 | Robinson et al. |
| 7,765,164 B1 | 7/2010 | Robinson et al. |
| 7,769,695 B2 | 8/2010 | Robinson et al. |
| 7,778,933 B2 | 8/2010 | Robinson et al. |
| 7,831,468 B1 | 11/2010 | Conte et al. |
| 7,836,485 B2 | 11/2010 | Robinson et al. |
| 7,882,032 B1 | 2/2011 | Hoffman |
| 7,970,678 B2 | 6/2011 | Lapsley |
| 8,015,118 B1 | 9/2011 | Robinson et al. |
| 8,260,716 B2 | 9/2012 | Hoffman et al. |
| 8,370,218 B2 | 2/2013 | Robinson et al. |
| 2002/0090117 A1 | 7/2002 | Kramer |
| 2002/0153424 A1 | 10/2002 | Li |
| 2002/0188842 A1 | 12/2002 | Willeby |
| 2002/0188872 A1 | 12/2002 | Willeby |
| 2004/0044739 A1 | 3/2004 | Ziegler |
| 2004/0073510 A1 | 4/2004 | Logal et al. |
| 2004/0129787 A1 | 7/2004 | Saito et al. |
| 2004/0177045 A1 | 9/2004 | Brown |
| 2004/0215615 A1 * | 10/2004 | Larsson et al. ...................... 707/9 |
| 2005/0035200 A1 | 2/2005 | Hendrick |
| 2005/0085931 A1 | 4/2005 | Willeby |
| 2005/0110103 A1 | 5/2005 | Setlak |
| 2005/0153779 A1 | 7/2005 | Ziegler |
| 2005/0194452 A1 | 9/2005 | Nordentoft et al. |
| 2005/0207624 A1 | 9/2005 | Ehlers et al. |
| 2005/0229007 A1 * | 10/2005 | Bolle et al. ...................... 713/186 |
| 2005/0240778 A1 | 10/2005 | Saito |
| 2005/0253683 A1 | 11/2005 | Lowe |
| 2005/0269402 A1 | 12/2005 | Spitzer et al. |
| 2005/0278222 A1 | 12/2005 | Nortrup |
| 2006/0032908 A1 | 2/2006 | Sines |
| 2006/0106734 A1 | 5/2006 | Hoffman et al. |
| 2006/0111977 A1 | 5/2006 | Hawkins |
| 2006/0113381 A1 * | 6/2006 | Hochstein et al. ............. 235/382 |
| 2006/0123465 A1 | 6/2006 | Ziegler |
| 2006/0136332 A1 | 6/2006 | Ziegler |
| 2006/0170530 A1 * | 8/2006 | Nwosu et al. .................. 340/5.53 |
| 2006/0213970 A1 * | 9/2006 | Trajkovic et al. .............. 235/380 |
| 2006/0265602 A1 | 11/2006 | Robinson |
| 2007/0131759 A1 | 6/2007 | Cox |
| 2007/0162337 A1 | 7/2007 | Hawkins |
| 2007/0189581 A1 | 8/2007 | Nordentoft et al. |
| 2007/0220272 A1 * | 9/2007 | Campisi et al. ................ 713/186 |
| 2007/0282677 A1 | 12/2007 | Carpenter |
| 2007/0288319 A1 | 12/2007 | Robinson et al. |
| 2007/0288320 A1 | 12/2007 | Cooper et al. |
| 2008/0019578 A1 * | 1/2008 | Saito et al. ...................... 382/124 |
| 2008/0097851 A1 | 4/2008 | Bemmel et al. |
| 2008/0147481 A1 | 6/2008 | Robinson et al. |
| 2008/0223925 A1 | 9/2008 | Saito et al. |
| 2008/0271116 A1 | 10/2008 | Robinson et al. |
| 2009/0066239 A1 | 3/2009 | Yabunouchi |
| 2009/0070270 A1 | 3/2009 | Robinson et al. |
| 2009/0074256 A1 | 3/2009 | Haddad |
| 2009/0099944 A1 | 4/2009 | Robinson |
| 2009/0138366 A1 | 5/2009 | Bemmel |
| 2009/0177587 A1 | 7/2009 | Siegal |
| 2009/0228362 A1 | 9/2009 | Lapsley |

FOREIGN PATENT DOCUMENTS

| | | |
|---|---|---|
| KR | 10-2001-0069593 A | 7/2001 |
| KR | 10-2004-0036850 A | 5/2004 |
| WO | WO 96/36934 A1 | 11/1996 |
| WO | WO 98/09227 A1 | 3/1998 |
| WO | WO 98/15924 A1 | 4/1998 |
| WO | WO 98/41947 A1 | 9/1998 |
| WO | WO 99/31621 A1 | 6/1999 |
| WO | WO 00/26849 A1 | 5/2000 |
| WO | WO 00/45247 A1 | 8/2000 |
| WO | WO 00/45320 A1 | 8/2000 |
| WO | WO 00/46710 A1 | 8/2000 |
| WO | WO 00/46737 A1 | 8/2000 |
| WO | WO 0049561 A1 * | 8/2000 |
| WO | WO 00/67187 A1 | 11/2000 |
| WO | WO 01/06440 A1 | 1/2001 |
| WO | WO 01/20531 A1 | 3/2001 |
| WO | WO 02/14984 A2 | 2/2002 |
| WO | WO 2007/092715 A2 | 8/2007 |
| WO | WO 2008/002979 A2 | 1/2008 |

OTHER PUBLICATIONS

International Preliminary Report on Patentability issued Jun. 15, 2010 with Written Opinion.

Office Action mailed on Aug. 3, 2010 in related U.S. Appl. No. 12/001,499; 9 pages.

Office Action mailed on Jan. 24, 2011 in related U.S. Appl. No. 12/001,499; 21 pages.

International Search Report mailed on Oct. 1, 2009 in PCT/US2008/086404; 9 pages.

U.S. Appl. No. 10/678,646, filed Oct. 6, 2003; Robinson et al. (31 pages).

Non-Final Office Action for U.S. Appl. No. 12/001,449, dated Jul. 11, 2011, 16 pages.

(56) References Cited

OTHER PUBLICATIONS

Final Office Action for U.S. Appl. No. 12/001,449, dated Oct. 26, 2011, 16 pages.
Non-Final Office Action for U.S. Appl. No. 12/001,449, dated Jul. 23, 2012, 20 pages.
Final Office Action for U.S. Appl. No. 12/001,449, dated Feb. 4, 2013, 12 pages.

* cited by examiner

BIOMETRIC ACCESS CONTROL TRANSACTIONS

FIELD OF THE INVENTION

Aspects and embodiments of the present invention relate in general to methods and devices for biometrically identifying and authenticating a user during an access control transaction. More specifically, certain aspects and embodiments of the present invention provide methods and access control processor devices for biometric authentication of a user to prevent unauthorized access to a secured location, object and/or data.

BACKGROUND

Currently, a variety of devices and methods have been developed in an attempt to improve authentication fidelity and to safeguard sensitive personal identity and private information in light of the increasing security threat due to the rapid advancements in networking and mobile communication technologies. However, certain authentication technologies in use today are still based on the traditional "knowledge-based factor" or "possession-based factor" identification and verification approaches. In a typical knowledge-based authentication approach, only one authentication factor (such as knowledge of a password is required in order to gain access to a system. In a possession-based authentication approach, possession of one authentication factor (e.g. possession of card or token) is required in order to gain access to a system. More recently, some of these technologies have been implemented in combination as two-factor authentication schemes wherein both knowledge-based and possession-based factors are required simultaneously for authentication. These types of authentications have recently gained increasing acceptance. An example of such authentication scheme is the common bank card transaction wherein the card itself represents the authorizing possession factor (bearer has the card) and the corresponding personal identification number (PIN) represents the authorizing factor that is known only to the account holder. However, despite these apparent additional layers of security, misplacement of the possession factor such as lost or stolen cards and a breach of the knowledge factor (such as compromised password) remain problematic for these types of transactions. As a result, when the possession factor (e.g. card) and the password are simultaneously compromised or duplicated, there is no apparent suitable countermeasure for the breach as it is no longer possible to authenticate the true identity of the holder of said device.

In a typical access control transaction using the traditional two factor verification system, a bearer of the access control-processor device, such as, for example, an access card, presents the card to gain access or entry to a secured site. The card presented by the bearer is read or swiped using a magnetic reader or other similar devices. The information contained on the magnetic stripe of the card is read and transmitted to the issuing institution. The institution then interrogates its database of active cards against the information received. If the institution verifies that the card is valid and active, and/or when additional verification parameters are met, an approval is provided to the card holder to gain entry. In some instances, additional authentication scheme based on interrogation of information only known to the user such as, for example, a password, may be used to supplement and/or enhance the security scheme.

However, despite these apparent additional layers of security, misplacement of the possession factor such as lost or stolen cards and a breach of the knowledge factor (such as compromised passwords) remains problematic for these types of transactions. Within these conventional authentication systems, when the possession factor (e.g. card) and the password are simultaneously compromised or duplicated, there is no apparent suitable countermeasure for this type of security breach as it is no longer possible to authenticate the true identity of the holder of said device.

In light of these security threats, the use of access control processor devices (e.g. cards or badges) by non-authorized bearers continues to present a difficult and costly problem for institutions. Various security features have been designed and implemented with mixed success to minimize these types of fraud and security breach. Thus, there remains a need for improved methods and devices for user authentication during access control transactions.

SUMMARY OF THE INVENTION

To address some of the problems and needs as stated in the forgoing, aspects and embodiments of the presented invention directed to methods and devices for conducting access control transactions using biometric authentication are provided.

Aspects and embodiments of the present disclosure provide methods and devices for authenticating the identity of the account holder associated with an access control processor device. In once aspect, an access control transaction processor device with a front face and a back face, a communication element, a power source affixed to the device, the power source connected to the communication element on the device, and a biometric detection system connected to the power source, is provided. In certain embodiments, the biometric detection system may include a contact surface configured for the placement of user finger(s) to receive biometric input, a biometric sensor or detector for obtaining an electronic profile of the finger of the user that is placed on the contact surface, and/or a sensor, including pressure sensor, for detecting the pressure profile generated by applying the finger of the user to the contact surface.

Aspects of the invention also provide a method of authenticating a user for an access control transaction. The method comprises providing an access control transaction processor device (e.g. card) by inputting user biometric information into a biometric verification system of the access control processor card, verifying the biometric information entered into the biometric verification system with pre-stored biometric information of the access control processor card, activating a communication element on the card when the biometric information entered into the biometric verification system is successfully verified, and maintaining an inactive status for the communication element on the card when the biometric information entered into the biometric verification system is not successfully verified.

Other systems, methods, and/or products will be or become apparent to one with skill in the art upon review of the following drawings and detailed description. It is intended that all such additional systems, methods, and/or products be included within this description, be within the scope of the present invention, and be protected by the accompanying claims.

DETAILED DESCRIPTION

Accordingly, aspects and embodiments of the present invention provide an access control processor device configured to allow for authentication of the bearer of the card. In addition, there is provided an access control processor device that will allow for authentication of the user based on biometric information. Furthermore, there is provided an access control processor card configured for biometric authentication of the user, while having the capability of being used with conventional access control card reading devices, systems, and/or networks.

The present invention now will be described more fully hereinafter with reference to the accompanying drawings, in which illustrative embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used in this specification, specify the presence of stated features, steps, operations, elements, and/or components, but do not preclude the presence or addition of one or more other features, steps, operations, elements, components, and/or groups thereof.

Aspects of the present invention relate generally to methods and devices for conducting access control transactions. Certain exemplary embodiments relate to biometric authentications in connection with these transactions.

As used herein, access control processor device embodiments of the present invention may include, for example, contact cards, contactless cards, tokens, or badges. As used herein, an access control processor device may be broadly understood as being a portable access control processing device associated with an account or authorized user within an access control system. Suitable access control card embodiments may include a plastic card, a badge or other access control devices comprising a solid support, including for example, plastic support such as PVC or ABS plastic. In certain embodiments, the device may include imprinting feature's and/or a hologram to avoid counterfeiting.

In one aspect, an access control transaction card embodiment configured to allow for authentication of the bearer of the card is provided.

In certain embodiments, the authentication is based on successful verification of biometric information.

In certain embodiments, the authentication is based on successful verification of the biometric information in combination with successful verification of a password. In certain other embodiments, the biometric authentication scheme may be optionally combined with an additional authentication feature based on verification of additional information known only to the user during a transaction.

In certain embodiments, the access control processor device comprises a biometric information verification system or components thereof.

In certain embodiments, the access control processor device comprises a biometric information input detector and an authentication logic processor.

In certain other embodiments, the biometric detector may further comprise a thin-film biometric sensor pad configured to acquire the card holder's biometric profile.

In another aspect, an access control processor card configured to allow for authentication of the user, while having the capability of being used with conventional card reading apparatus, system, and/or networks, is provided.

In certain embodiments, the biometric information verification/input system may comprise a thin-film biosensor pad. The biometric information verification system may be configured to capture, store, and authenticate (include identification and/or verification) of biometric information via a logic processor.

In an exemplary embodiment of the invention, the access control processor device may further comprise at least one hologram on at least one of the front and the back face of the card. Furthermore, the access control processor device may be configured to include a power source.

In other embodiments, the access control processor device may further comprise a unique identification number on the face (e.g. front face) of the card.

In other embodiments, the method may further comprise entering the biometric information into the biometric verification system, deactivating the communication element on the card when the pre-stored biometric information does not match after a predetermined amount of time.

In other embodiments, the method can further comprise deactivating the one of the active magnetic strip, the contactless radio frequency (R.F.) unit and the processor (e.g. computer chip) on the card when the biometric information and the pre-stored biometric information do not match. Additionally, the method may further comprise permanently deactivating all functions of the card after the biometric information entered into the biometric input system and the pre-stored biometric information do not match after three or more attempts.

In other embodiments, the method may also comprise providing a master unlocking code for the card to re-activate functions of the card deactivated after the biometric information entered into the biometric input system and the pre-stored biometric information do not match after prescribed number of attempted entries (e.g. three or more attempts).

As used herein, access control transaction includes all transactions wherein access to a site, whether physical or virtual, is permitted only after authentication. Authentication may include identification and/or verification of the identity of the person requesting entry thereto. Exemplary physical access sites may include, for example, buildings, perimeters, rooms, floors, gates, and/or airport terminals. Exemplary virtual access sites may include, for example, computers, networks, data, and/or websites.

As used herein, a biometric information verification system may include a biometric information input and verification components and/or subsystems configured to read, acquire, and authenticate the input biometric information/data profile of a user. The systems may include a biometric input detector or sensor and a logic processor (e.g. chip) to acquire, store, verify, process, interrogate, and/or authenticate user biometric information, such as, for example, fingerprint profile data. Sensors, detectors, processors, and various components or subsystems of the biometric information verification systems may be integrated into a single payment processor device or may be separately located within a system or network. Exemplary biometric detectors may include a thin-film substrate, or a thin-film transistor (TFT) layer on the thin-film substrate, and an array of electric field sensing electrodes adjacent the TFT layer for receiving a finger profile. The TFT layer may include a plurality of TFTs defining a respective TFT amplifier stage for each electric field sensing electrode. The sensor may further include a finger excitation electrode adjacent the array of electric field sensing electrodes, and at least one integrated circuit adjacent the thin-film substrate. The integrated circuit may include a monocrystalline substrate and processing circuitry adjacent the monocrystalline substrate and connected to the TFT amplifier stages. Optical, ultrasonic and other type fingerprint sensors may also be used as would be readily understood by those skilled in the art. Biometric input apparatus and related technology are well known in the art, including those described in U.S. Pat. No. 6,131,464.

In certain embodiments, a finger to be scanned is placed upon the contact surface of a biometric information input sensor, such as, for example, a pressure sensor. The pressure sensor detects the amount of pressure exerted by the finger upon contact surface. The pressure sensor inputs data from measured pressure and the user fingerprint profile data is acquired, stored, and processed by the biometric information system processor. During operation, the applied pressure of a finger upon contact surface may be monitored to ensure proper finger pressure is maintained throughout the scanning process. Once the fingerprint profile data of a user is acquired, the processor of the biometric information system will determine whether the image obtained is a suitable for subsequent interrogation with known user profile data. In certain embodiments, optical fingerprint scanners may be utilized and such exemplars are commercially available from companies such as L-1 Identity Solutions, Digital Persona, Inc., Digital Biometrics, Inc., and Startek, Inc. In certain other embodiments, non-optical finger image scanners may be used, exemplars are commercially available through companies such as, for example, SGS-Thomson.

In certain embodiments, the pressure detector comprises a thin-film pressure sensor, such as, for example, commercially available Uniforce sensors from Force Imaging Technologies. The pressure sensor generates an electric resistance that is proportional to the pressure placed on the pressure sensor. This variable resistance is then converted to an analog voltage via a conventional op amp circuit. This analog voltage can then be processed by the biometric information processor.

In certain other embodiments, the biometric information detection system may have the ability to sequentially or simultaneously acquire multiple information profiles, such as, for example, optical images in combination with pressure profile data. In certain embodiments, the pressure sensor may comprise a piezoresistive strain gauge. This strain gauge may be attached to the back of the finger image sensor. When a finger is placed on the sensor, the pressure from the finger deforms the sensor package slightly. The strain gauge converts this deformation into a variable resistance that is proportional to the finger's pressure. In certain embodiments, multiple sensors may be configured into one verification system or device.

In yet another embodiment, the image sensor and the pressure sensor may be combined in a single integrated circuit. In this embodiment, the capacitive pressure sensors are distributed on the surface of a capacitive fingerprint sensor via a complementary metal oxide semiconductor (CMOS)—compatible silicon micromachining process. Averaging the output of the collection of pressure sensors provides an overall indication of the amount of pressure on the finger print sensor. In other embodiments, the pressure sensor comprises compressive load cells, linear variable differential transformer (LVDT) transducers, capacitive transducers, piezoelectric transducers, and quartz transducers, as is known in the art. Other embodiments will place the pressure sensor relative to the finger image scanner and contact surface in other configurations, as will be apparent to one of skill in the art; all are to be considered within the scope of the present invention.

As used herein, biometric information includes biometric information profiles that may be authenticated singly or in combination with passwords or tokens, to improve the security of existing authentication systems. Authenticating factors may include knowledge based factors such as, for example, a password; or possession factors such as, for example, a credit card or security token.

As used herein, the authentication may include processes of identification and verification of individuals based on unique physical or behavioral characteristics. Certain of these processes may include matching patterns of individuals against databases of records, including gathering proof of identities, enrolling biometric data and converting the data into templates, and/or matching templates to stored records using algorithms.

As used herein, biometric-based authentication applications may include workstation, network, and domain access, single sign-on, application logon, data protection, remote access to resources, transaction security and web security. As used herein, biometric authentication may be used alone or integrated with other technologies such as smart cards, encryption keys and digital signatures, to enhance security.

As used herein, biometric information may include unique physiological information that related to the account holder. Exemplary information includes fingerprints and related profiles, which may include optical, physiological and/or morphological characteristics; as well as differential profiles, including differential pressure profiles generated based on the distinct impressions between the ridges and valleys of the papillary lines in the finger of the account holder. Other exemplars may also include temperature, electrical resistance, pulse, finger pressure, blood pressure, face recognition, hand geometry and iris recognition profiles. It is understood that authentication scheme may be based on single biometric information profile or combinations thereof.

As used herein, fingerprint may include an impression of the friction ridges of all or any part of the finger. A friction ridge may include a raised portion of the epidermis on the palmar (palm and fingers) or plantar (sole and toes) skin, consisting of one or more connected ridge units of friction ridge skin. These ridges are sometimes known as "dermal ridges" or "dermal papillae". Fingerprints may be deposited in natural secretions from the eccrine glands present in friction ridge skin (secretions consisting primarily of water) or they may be made by ink or other contaminants transferred from the peaks of friction skin ridges to a relatively smooth surface such as a fingerprint card. Fingerprint includes impressions transferred from the pad on the last joint of fingers and thumbs. In certain embodiments, fingerprint may include portions of lower joint areas of the fingers (which may also used to make identifications).

As used herein, fingerprint identification includes art understood processes related to the field of dactyloscopy. It may include the process of comparing questioned and known friction skin ridge impressions (e.g. Minutiae) from fingers, palms, and toes to determine if the impressions are from the same finger (or palm, toe, etc.). The flexibility of friction ridge skin means that no two finger or palm prints are ever exactly alike (never identical in every detail), even two impressions recorded immediately after each other. Fingerprint identification (also referred to as individualization) occurs when an expert (or an expert computer system operating under threshold scoring rules) determines that two friction ridge impressions originated from the same finger or palm (or toe, sole) to the exclusion of all others.

As used herein, fingerprint types may include latent prints. Exemplary latent prints include hidden, invisible, or accidental impression left by friction ridge skin on a surface, regardless of whether it is visible or invisible at the time of deposition, whether they are from natural secretions of the eccrine glands present on friction ridge skin (which produce palmar sweat, sebum, and various kinds of lipids), or whether the impression is in a contaminant such as motor oil, blood, paint, ink, etc.

As used herein, fingerprint types may include patent prints. Exemplary patent prints may include friction ridge impressions of unknown origin which are obvious to the human eye and are caused by a transfer of foreign material on the finger, onto a surface.

As used herein, fingerprint types may also include plastic prints. Exemplary plastic print include friction ridge impressions from a finger or palm (or toe/foot) deposited in a material that retains the shape of the ridge detail.

As used herein, fingerprints may also include all the art understood fingerprint and related print profiles from the following categories: Roscher system, the Vucetich system, and the Henry system. In the Henry system of classification, fingerprint patterns may include Arch, Loop and Whorl profiles. Fingerprints may also include patterns to plain arches or tented arches. Loops may be radial or ulnar, depending on the side of the hand the tail points towards. Whorls may also have sub-group classifications including plain whorls, accidental whorls, double loop whorls, and central pocket loop whorls.

As used herein, suitable biometric information useful for interrogation and authentication of individual identify may include profiles from the following standards and specifications: International Committee on Information Technology Standards M1 (biometrics section of national organization that produces technical standards for the American National Standards Institute (INCITS M1) and International Standards Organization (ISO) SC37 Minutiae-Based Fingerprint Data Interchange Format: International Standards Organization JTC1 SC17 WG3; ANSI/INCITS 378-2004, ANSI/INCITS 385-2004; BioAPI: ANSI/INCITS 358-2002: CBEFF: ANSI X9.84-2002: and X.509 Attribute Certificate.

As used herein, communication element may include one of an active magnetic strip, a contactless radio frequency unit, and an authenticating processor (e.g. chip). The magnetic strip may contain unique user-associated data. In certain embodiments, the magnetic strip may be activated after initial authentication of user identity so the unique user-associated data encoded on the strip may become accessible to the processor.

As used herein, authentication processor may include a chip or logic processor configured to acquire, store, verify, analyze, interrogate, or authenticate unique user data and/or biometric information profiles. It is understood by those known in the art that instructions for authentication methods and device embodiments may be stored on a non-volatile programmable memory and executed by a processor. Non-volatile programmable memory is configured to be an application memory device, and may store information such as the primary account number, current balance information, and/or user biometric profiles. Examples of non-volatile programmable memory include, but not limited to: a magnetic stripe, flash memory, Electrically Erasable Programmable Read-Only Memory. (EEPROM), or any other non-volatile computer memory or storage known in the art. The processor and the non-volatile programmable memory may be coupled to one another through an internal bus system. Data can be interchanged between the biometric sensors, the processor, and the non-volatile programmable memory.

As used herein, biometric sensor may be configured to recognize directionality and orientation of the fingerprint profile (e.g. right or left thumb). Additionally, the biometric sensor may be configured to accommodate various readers' geometry at the points of transaction (POT). Exemplary biometric detector or sensor may include temperature (e.g. heat) sensors; optical sensors (e.g. optical properties, images), capacitive sensors; solid-state sensors (e.g. electrical resistance); pulse sensors, blood pressure sensors, pressure sensor (e.g. differential pressure between the ridges and valleys of the papillary lines, ultrasonic sensors, light sensors; and/or movement detectors.

Figure 1:
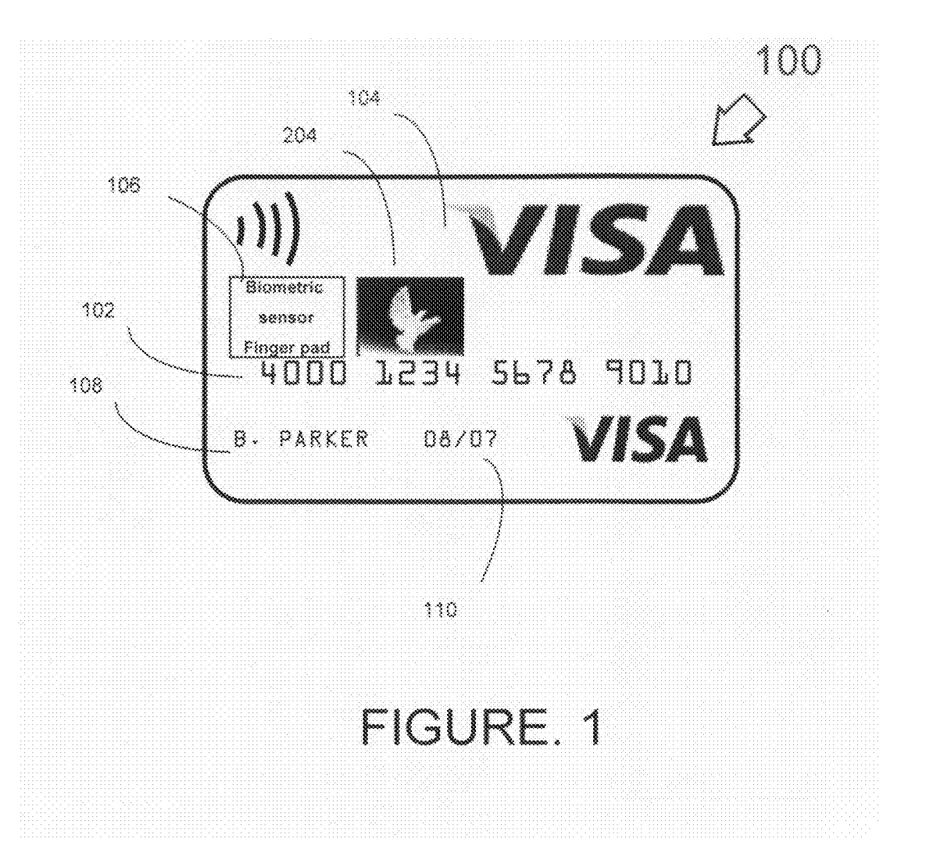
FIG. 1 is an illustration of a front face of an exemplary access control processor card constructed and operative in accordance with an embodiment of the present invention.

Referring to FIG. 1, an exemplary access control processor card embodiment 100 for conducting access control transactions is illustrated. The card 100 is provided with individual components so access control transactions may be accomplished in a safe, secure, and convenient process. A serial number 102 is provided on the card 100, wherein the serial number is a unique identifier for the card 100. The serial number 102, in the illustrated embodiment, is a series of numbers that are unique to the card 100. Although illustrated as having a series of numbers, letters or a combination of numbers, letters and symbols, for example, may be used to identify one card 100 from different cards. The serial number 102 is imprinted in the body of the card 100 in the illustrated embodiment. The card 100 has a front face 104 that illustrates the serial number 102. The front face 104 of the card 100 is also configured with a name section 108 and an expiration date section 110. Although listed as an expiration date section 110, an issue date for the card 100 may also be included. The face of the card may also be configured with a biometric information input sensor/detector 106 positioned on the card 100. The biometric information input sensor/detector 106 is connected to (or may be a component of) the biometric verification system 209, the power source 302 and the communication element (e.g. active magnetic strip) 200.

Figure 2:
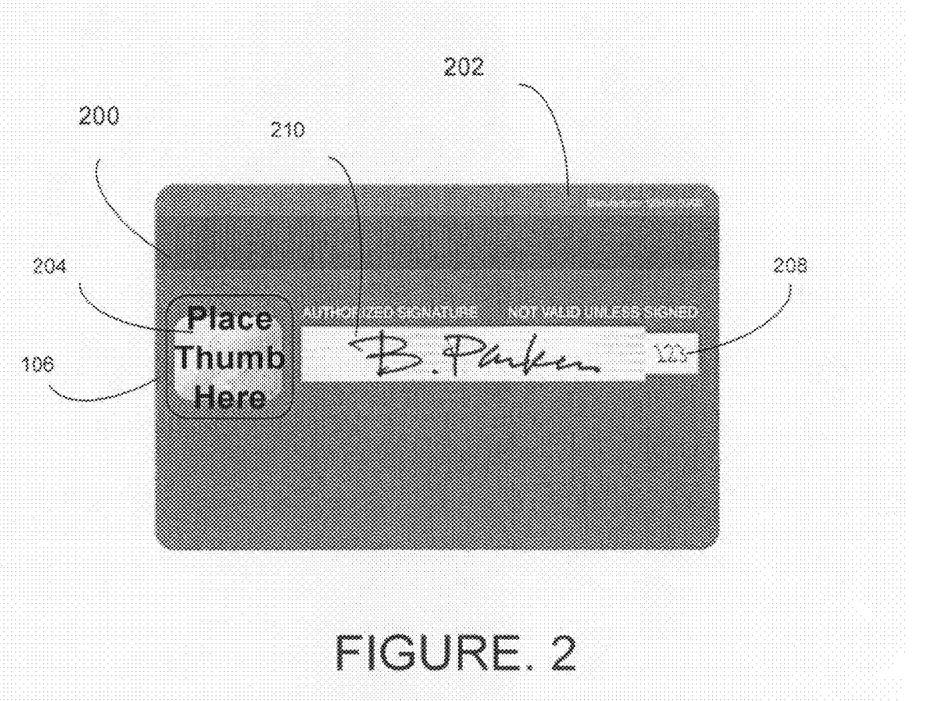
FIG. 2 is a back view of an exemplary access control processor card constructed and operative in accordance with an embodiment of the present invention.

Referring to FIG. 2, a back surface 202 of an access control processor card 100 is illustrated. The back surface of the card 100 is provided with a magnetic strip 200 that is used to identify the card 100 through a conventional magnetic strip reader. In the illustrated embodiment, the magnetic strip 200 is an active magnetic strip that is configured to have a permanently encoded set of data provided by the issuing institution. In the illustrated embodiment the magnetic strip 200 is an active magnetic strip that allows the encoded set of magnetic data to be read only when the magnetic strip 200 is activated through a power source 302 on the card 100. At times that the magnetic strip 200 is not activated, a conventional card reader will not be able to access data placed upon the magnetic strip 200.

In addition to the magnetic strip 200, a hologram 204 is provided at the back of the card 100 to allow a merchant to visually identify if the card 100 has been officially produced by the issuing institution. A security code feature 208 is also provided at the back of the card 104 for further identification purposes if needed. The card 100 is also provided with a signature block 210 upon which a bearer provides a signature for visual authentication purposes if required.

The back surface 202 may also be configured with a biometric information input sensor/detector 106 positioned on the card 100. The biometric information input sensor/detector 106 is connected to (or may be a component of) the biometric verification system 209 and/or the communication element (e.g. active magnetic strip) 200. The card 100 may also have a contactless radio frequency unit 216 and a logic processor 218 on the card 100.

Figure 3:
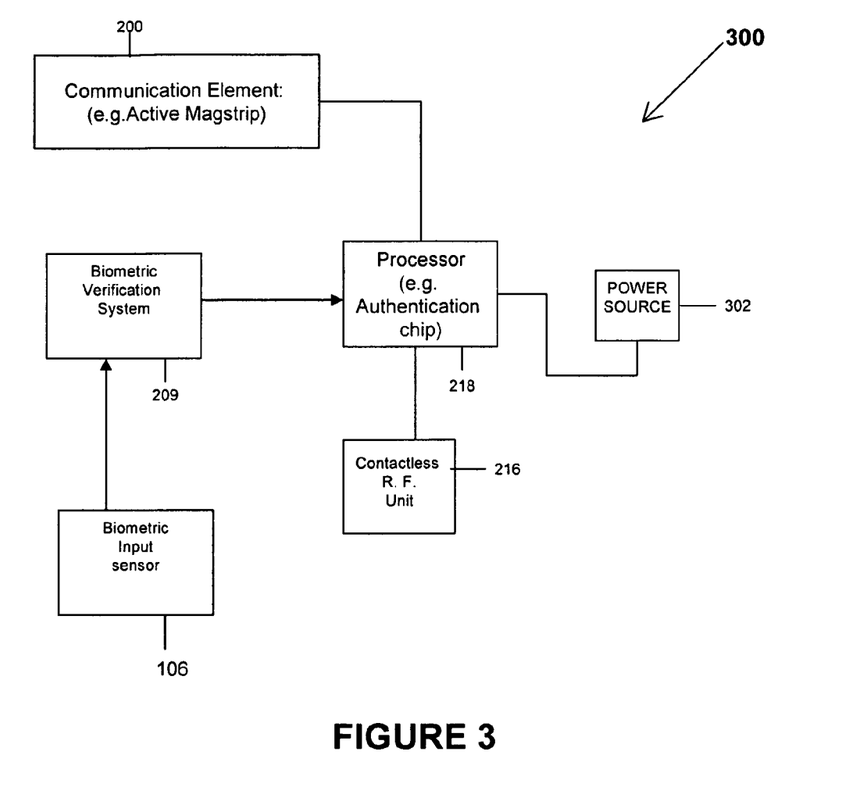
FIG. 3 is a schematic view of components within an exemplary access control processor device constructed and operative in accordance with an embodiment of the present invention. Exemplary biometric information verification system logic processor may include an authentication processor chip.

Referring to FIG. 3, a section 300 illustrating the components of the card 100 is presented. In the illustrated embodiment, a power source 302 is connected to a biometric information input sensor/detector 106 that in turn is connected to a logic processor (e.g. chip) 218. The power source 302 is configured to supply electrical power to the other components of the section 300 when necessary. The biometric information input sensor/detector 106 is configured such that a person bearing the card 100 may input biometric information into the processor 218 through the biometric information input sensor/detector 106. The individual sensors or detectors may receive power from the power source 302. Once biometric information are entered into the into the processor 218, an internal check is performed between a unlocking biometric information combination that is stored in the processor 218 and the biometric information that are entered and stored and analyzed on the biometric information verification system 209. If the internal check performed indicates that the biometric information input in the biometric information verification system 209 is the same as the unlocking biometric information combination that is stored in the processor 218, then the processor 218 allows power to flow from the power source 302 to the active magnetic strip 200. The active magnetic strip 200 is then electrically powered for a pre-determined amount of time and then de-energized. During the time the magnetic strip 200 is activated, the magnetic strip 200 may be read by a conventional magnetic strip reader.

The processor 218 may also be configured to permanently lock the active magnetic strip 200 when a predetermined number of incorrect biometric information entries are provided to the biometric information verification system 209. In the illustrated embodiment, the processor 218 is configured to allow three (3) incorrect biometric information entries before permanently locking the active magnetic strip 200.

The power source 302 may also be charged through use of the biometric sensor as they are compressed by the bearer. Alternative power source configurations are also possible. In all situations, the power source 302 is configured to provide electrical power to the biometric information verification system 209 in a sufficient amount to allow the processor 218 and the biometric information verification system 209 to function for authentication purposes. Alternative configurations of the present invention are also provided wherein instead of an active magnetic strip 200, a contactless radio frequency unit 216 may be activated. In a still further alternative configuration, the processor 218 may itself provide an authorization code.

The power source 302 may be positioned on any layer of the card 100 as well as any position along the body of the card 100. The biometric input sensor/detector 106 may also be configured underneath the front surface 106, as a non-limiting example.

The biometric input sensor/detector 106 may be positioned along any section of the card 100 as a surface feature of the card 100 or may be internally positioned within the card 100. In an exemplary embodiment of the invention, when the sensor pad is located within the body of the card 100, a plastic surface may be placed over the top of biometric input sensor/detector from abrasion during use of the card 100. The biometric input sensor/detector 106 is also connected to the processor 218 such that when activated, the system 209 may accept and verify biometric information related to a bearer of the card 100. To this end, the biometric input sensor/detector 106 may be connected to a separate processor 218, or may have the processor placed within the biometric verification system 209 or input sensor/detector apparatus that will verify both pad information and biometric information.

Figure 4:
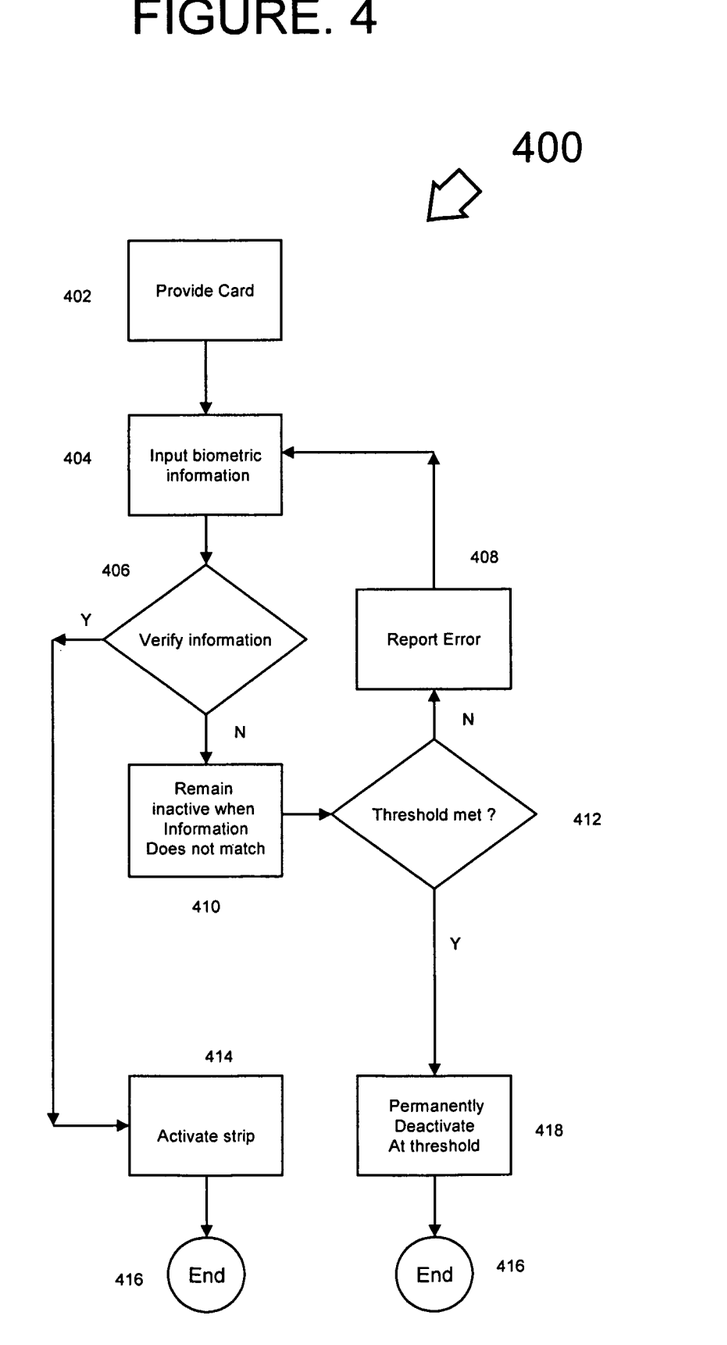
FIG. 4 is a flow chart of an exemplary method of biometrically authenticating a bearer of an access control processor card constructed and operative in accordance with an embodiment of the present invention.

Referring to FIG. 4, which illustrates an exemplary method comprising inputting 404 biometric information into a biometric input sensor/detector 106 of the access control transaction card 100. In the exemplary embodiment, the biometric information is a finger/thumb print. The biometric information entered into the biometric input sensor/detector 106 is processed and verified 406 against the pre-stored biometric information of the access control transaction card 100 by the biometric verification system 209 or the processor 218 as an alternative embodiment. The biometric input sensor 106 in the exemplary embodiment contains a window that allows a users fingerprint, for example, to be entered into the system 209. The system 209 may then check the input biometric information with a pre-stored biometric information data set on the card 100. If the data do not match, then the card 100 can not be activated. The user can be prompted to reenter the biometric information 408. The re-entry request for the correct biometric information can be repeated until a pre-determined threshold 412 (e.g. number of aborted entries or attempts) is reached. At which time, the device is permanently inactivated 418. If the biometric data match, then the card functions such as the magnetic strip information can be activated for further processing. The pre-stored biometric information may be entered by the issuer of the card 100 or may be input by the user during the initial receipt of the card 100 during activation. During activation, various card features are activated, including providing the card code information and enable the active magnetic strip to energize so that it may be read by a card reader. In addition, a contactless radio frequency unit 216 or the processor 218 on the card 100 can also be activated if the card 100 is so featured.

The pre-stored biometric information may be entered by the issuer of the card 100 or may be input by the user during the initial receipt of the card 100 during activation.

During the interrogation/verification process (e.g. when the device is not fully activated or reached a permanent inactivation), the method provides for maintaining an inactive status 410 for one of the active magnetic strip, the contactless radio frequency unit 216 and the processor 218 on the card 100 when the biometric information and the pre-stored biometric information do not match and requiring the user to re-enter the information. If the strip is activated 414 upon verification, then the strip is deactivated after completion of the transaction or after a pre-defined amount of time has elapsed after activation. The amount/time of activation may also be related to the power requirements for card functions so that the power supply is not overburdened during a transaction. The method 400 may be completed again after deactivation of the active strip has been completed. In addition, an additional security measure may be used in the invention, where the issuing entity may have a master lock combination that may be input into the card 100 to allow further attempts at strip activation, or may allow for instantaneous strip activation as necessary, thereby minimizing the amount of replacement cards that would be necessary if permanent deactivation occurs. The method may also provide for a master unlocking code for the card to re-activate functions of the card after at least one of the input biometric information and the pre-stored biometric information do not match after a predefined number of attempts. By providing for the master unlocking code, an issuer may allow reactivation of the card 100 that has been locked due to inappropriate biometric or numeric data input.

Embodiments of the invention provide an access control processor card configured to allow for both power generation on the card 100 and verification of the authenticity of a user. The authentication of the bearer/user of the access control card 100 that is based on a verification scheme using biometric information profile has a higher fidelity compared to that of conventional card transactions. This authentication process is difficult to replicate, and therefore fraud is prevented or substantially reduced. The card 100 has a configuration that will also allow for the user to store biometric information to allow authentication of the card 100. Embodiments of the invention also provide a card 100 that will allow for authentication of the user, while being cost efficient in production. The card 100 presented above also has the capability of being used with conventional card reading apparatus, systems and networks.

Embodiments of the invention also provide a card 100 that will have a configuration that will allow for the power generated on the card 100 to be stored for use by components/circuitry on the card 100.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than in a restrictive sense.

What is claimed is:

1. An access control processor card, comprising:
a fingerprint sensor configured to receive input biometric information from a finger of a user;
a processor, coupled to the fingerprint sensor, configured to authenticate user identity by interrogating the input biometric information against a pre-stored user biometric profile stored within the card and by verifying a password or a token, the input biometric information including both a pressure profile and an optical image for the user;
a communication element coupled to the processor and configured to activate upon the authentication of the input biometric information;
permanently deactivate one or more functions of the access control processor card after determining that the input biometric information and the pre-stored biometric information do not match after a predetermined number of attempted entries; and
reactivate the one or more permanently deactivated functions of the access control processor card when a master lock combination is input into the card.

2. The access control processor card of claim 1 wherein the communication element is a magnetic stripe.

3. The access control processor card of claim 1 wherein the communication element is a contactless radio frequency (R.F.) unit.

4. The access control processor card of claim 1, further comprising a power source, wherein the power source is electrically coupled to the processor, the fingerprint sensor, and the communication element.

5. The access control processor card of claim 4, wherein the power source is charged when the biometric sensor is compressed by the user.

6. The access control processor of claim 1 wherein the fingerprint sensor includes a one or more thin-film transistors (TFT) disposed on a thin-film substrate.

7. A method of authenticating a user for an access control transaction, comprising:
receiving user biometric information into a biometric verification system in an access control processing device, the user biometric information including both a pressure profile and an optical image for the user;
authenticating the user biometric information entered into the biometric verification system in combination with a password or a token;
activating a communication element in the access control processing device when the input biometric information entered into the biometric verification system is authenticated;
maintaining an inactive status for the communication element in the access control processing device when the biometric information entered into the biometric verification system is not authenticated;
permanently deactivating one or more functions of the card after the user biometric information entered into the biometric verification system and a pre-stored biometric information do not match after a predetermined number of attempted entries; and
reactivating the one or more permanently deactivated functions of the card when a master lock combination is input into the card.

8. The method according to claim 7 wherein the communication element is an active magnetic stripe.

9. The method according to claim 7 further comprising:
authenticating user identity by interrogating input biometric information profile against pre-stored user biometric information profile.

10. The method according to claim 7, wherein the biometric verification system comprises a biometric fingerprint pressure sensor.

11. The method according to claim 7 wherein the fingerprint is a thumbprint.

12. The method according to claim 10, wherein the sensor is configured to recognize the directionality and the orientation of the fingerprint information.

13. The method of claim 7, wherein receiving the user biometric information includes receiving the user biometric information via a piezoelectric sensor on the access control processing device.

14. The method of claim 7 wherein the predetermined number of incorrect biometric entries is three.

15. The method of claim 7 wherein during authentication:
monitoring an applied pressure while receiving the pressure profile; and determining if a threshold finger pressure is maintained throughout a scanning process.

16. An access control processor device, comprising:
a biometric input sensor configured to receive user biometric information;
a biometric verification processor configured to authenticate the input user biometric information in combination with a password or a token, the user biometric information including both a pressure profile and an optical image for the user;
a communication element configured to activate when the biometric information entered into the biometric verification system is authenticated and maintain an inactive status for the communication element on the payment processor device when the biometric information entered into the biometric verification system is not authenticated;
permanently deactivate one or more functions of the access control processor device after the biometric information entered into the biometric verification system and a pre-stored biometric information do not match after a predetermined number of attempted entries; and
reactivate the one or more permanently deactivated functions of the access control processor device when a master lock combination is input into the card.

17. The access control processor device according to claim 16, wherein the processor is configured to authenticate user identity by interrogating input biometric information profile with pre-stored user biometric information profile.

18. The access control processor device according to claim 16, wherein the communication element is an active magnetic stripe.

19. The access control processor device according to claim 16, wherein the communication element is a contactless radio frequency (R.F.) unit.

20. The access control processor device according to claim 16, wherein the biometric verification system comprises a biometric fingerprint sensor.

21. The access control processor device according to claim 20, wherein the biometric fingerprint sensor is a fingerprint pressure sensor.

22. A non-transitory computer readable medium, encoded with data and instructions, such that when executed by an access control processing device, the instruction causes the device to:
receive user biometric information into a biometric verification system, the user biometric information including both a pressure profile and an optical image for a user;
generate input user biometric information profile;
authenticate input user biometric information entered in the biometric verification system with pre-stored authorized user biometric profile in combination with a password or a token;
activate a communication element on the access control processing device when the biometric information entered into the biometric verification system is authenticated;
maintain an inactive status for the communication element on the access control processing device when the biometric information entered into the biometric verification system is not authenticated;
permanently deactivate one or more functions of the access control processing device after the user biometric information entered into the biometric verification system and a pre-stored biometric information do not match after a predetermined number of attempted entries; and
reactivate the one or more permanently deactivated functions of the access control processing device when a master lock combination is input into the card.

23. The non-transitory computer readable medium of claim 22 wherein the access control processing device includes:
a communication element configured to activate;
a non-volatile programmable memory configured to store an authorized user biometric information profile; and
a biometric verification system configured to authenticate input biometric information of the user.

* * * * *